No. 766,718. PATENTED AUG. 2, 1904.
H. E. MARSH.
ORE CONCENTRATOR.
APPLICATION FILED DEC. 6, 1902. RENEWED JAN. 14, 1904.
NO MODEL.

Inventor
Howard E. Marsh,
By Victor J. Evans.
Attorney

Witnesses

No. 766,718. Patented August 2, 1904.

UNITED STATES PATENT OFFICE.

HOWARD E. MARSH, OF NEW YORK, N. Y., ASSIGNOR, BY MESNE ASSIGNMENTS, TO JARVIS SIMMONS & COMPANY, INCORPORATED, OF NEW YORK, N. Y., A CORPORATION.

ORE-CONCENTRATOR.

SPECIFICATION forming part of Letters Patent No. 766,718, dated August 2, 1904.

Application filed December 6, 1902. Renewed January 14, 1904. Serial No. 189,059. (No model.)

*To all whom it may concern:*

Be it known that I, HOWARD E. MARSH, a citizen of the United States, residing at New York city, in the county of New York and State of New York, have invented new and useful Improvements in Ore-Concentrators, of which the following is a specification.

My invention relates to new and useful improvements in ore-concentrators relating to dry placer-mines; and its object is to provide a device of this character employing a magnetized plate for removing particles of iron or other similar metal and having means whereby clay or wet or dried sand may be fed to the apparatus and dried and the metal separated from the silicates by the utilization of magnetism and air-blasts.

With the above and other objects in view the invention consists in the novel construction and arrangement of the several parts, which will be more fully hereinafter described and claimed.

Figure 1:
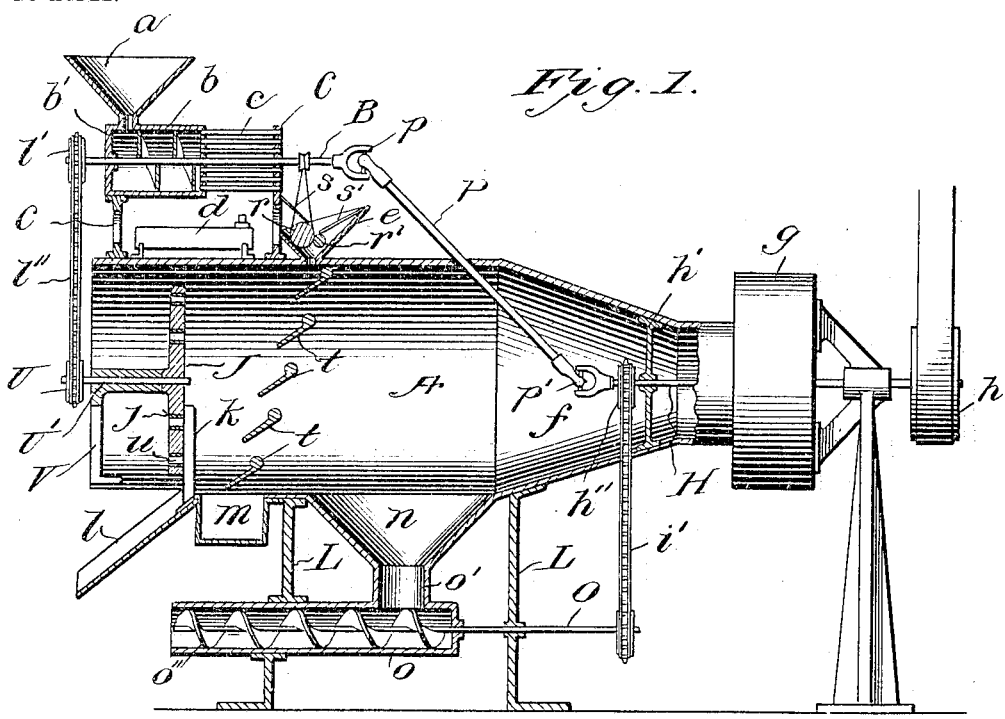
Figure 2:
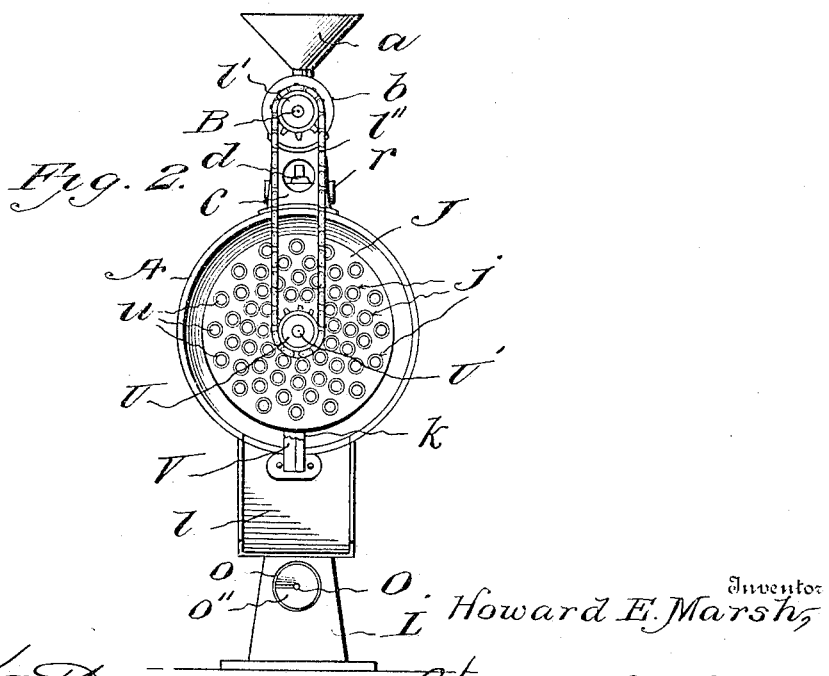

In the drawings, Figure 1 is a vertical longitudinal section through the apparatus, and Fig. 2 is an end elevation thereof.

Referring to the figures by letters of reference, A is a drum of suitable construction, preferably open at one end and having its opposite end $f$ tapered or reduced and opening into a fan-casing $g$. A horizontal shaft H is arranged centrally within the reduced end $f$ of the drum A and is adapted to be driven by a pulley $h$ at the outer end thereof. The inner end of shaft H is journaled within a suitable bearing $h'$ and is provided with a sprocket $h''$, upon which is arranged a chain $i'$, which passes downward through the drum and around a sprocket formed at one end of a shaft O. This shaft is journaled in one of the standards L of the drum and projects longitudinally within a cylinder $o$, having an inlet $o'$ extending downwardly from a funnel-shaped outlet $n$, arranged in the bottom of the drum A adjacent to the reduced end thereof. A worm $o''$ is secured to and incloses the shaft O at points within the cylinder $o$ and is for the purpose hereinafter more fully described.

Standards C are arranged upon the drum A at the end removed from the reduced portion $f$ thereof, and upon one of these standards is secured a small drum $b$, within which is journaled a shaft B, extending longitudinally through the center thereof and through the remaining standard C. The inner end of this shaft is connected, by means of a universal joint $p$, with a rod P, extending downwardly at an incline through the top of drum A, and connected at its lower end by a universal joint $p'$ to the inner end of the shaft H, before referred to. A series of tubes $c$ extend longitudinally from the inner end of the drum $b$, and their inner ends project through the inner standards C. A hopper $a$ opens into the top of drum $b$ at a point adjacent to the front end thereof, and a worm $b'$ is arranged within the drum $b$ and upon the shaft B for the purposes hereinafter described. A sprocket $l'$ is arranged at the outer end of shaft B and is connected, by means of a chain $l'$, to a sprocket U, secured on a shaft U'. This shaft is journaled in the upper end of a standard V, secured within the large open end of drum A, and the inner end of said shaft is secured to the center of a magnetic disk J, having a series of apertures $j$ therein, each of which is lined with a tube $u$, of brass or other magnetically-insulating material. The magnetic disk is made, preferably, of hard steel and is a permanent magnet which when once charged retains its magnetic power. It can be readily magnetized by any well-known method. A trough $l$ extends from the bottom of the drum A at a point directly below the magnetic disk J, and a scraper-bar $k$, of brass or other suitable material, extends upwardly therefrom into contact with the inner face of disk J.

A hopper $e$ is arranged upon the drum A at a point adjacent to and directly below the inner ends of the tubes $c$, and within this hopper are arranged crushing-rollers $r\, r'$, adapted to be driven in any suitable manner from the shaft B. Baffle-plates $s\, s'$ are located within the hopper at points above the rollers $r\, r'$ and serve to direct the material discharged from tubes c to the pass between the rollers. Inclined baffle-plates t are also arranged within the drum A at points below the outlet of hopper e, and these plates are so located in relation to each other as to direct the material discharged thereon into a receptacle m, located in the bottom of drum A at a point intermediate the outlet n and the trough l. A lamp d or any other form of heater is arranged upon drum A at a point below the tubes c, and is adapted to heat said tubes during the operation of the concentrator. When clay or wet sand is to be fed to the concentrator, it is placed in the hopper a, and thus fed to the drum b. As the shaft B is revolved, with the drive-shaft H, through the universal joint $p'$ and the connecting-rod P the worm $b'$ upon said shaft B will force the material inward into the tubes c, where it will be heated and dried and finally discharged upon the baffle-plates $s\ s'$, which will guide it to the pass between the rollers $r\ r'$. These rollers will pulverize the material and discharge it from the hopper upon the baffle-plates t, and as it slides from one to the other of these plates the fan upon shaft H and within the casing g will draw air through the drum and carry therewith the chaff or very light particles sliding from one of the plates t to the other and will deposit it upon the inclined walls of the reduced end f of the drum. From here it will slide in the form of tailings into the outlet n and the cylinder o, and the worm within this cylinder will discharge the tailings therefrom. As the crushed ore moves downward gradually from one baffle-plate to the other the magnetic disk J slowly revolves and attracts thereto the particles of iron or other magnetic metal contained within the silicates, and these particles will be scraped from the disk and into the trough l by the rod k. As the apertures j in the disk J are lined with brass or similar magnetic insulating material, the particles attracted to the disk will not accumulate within these apertures, and the same are therefore open at all times for the passage therethrough of air drawn to the fan within the casing g. The receptacle m receives the gold after it has passed over the several baffle-plates t.

When it is desired to feed dry sand to the concentrator, it is not necessary to employ the small drum b and its tube c, as this sand can be fed direct into the hopper e.

In the foregoing description I have shown the preferred form of my invention; but I do not limit myself thereto, as I am aware that modifications may be made therein without departing from the spirit or sacrificing the advantages thereof, and therefore I reserve the right to make such changes as fall within the scope of my invention.

Having thus described the invention, what is claimed as new is—

1. The combination with a drum having a magnetic disk at one end thereof and feeding mechanism upon the drum; of a suction-fan at the opposite end of said drum, and a series of baffle-plates interposed between said disk and fan.

2. The combination with a drum having a rotary magnetic disk at one end thereof, of a suction-fan at the opposite end of the drum, a hopper opening into the top of the drum, and a series of baffle-plates below said hopper and between the disk and fan.

3. The combination with a drum open at the ends and having a rotary magnetic disk in one end thereof; of a suction-fan in the opposite end of said drum, a hopper upon the drum, a series of baffle-plates below said hopper and between the disk and fan, and a receptacle for receiving material from said plates.

4. In an ore-separator, the combination with a drum open at both ends and having a suction-fan at one end thereof and feeding mechanism upon the drum; of a magnetic disk at the opposite end of said drum and having a series of apertures therein, and an insulating-lining within each of said apertures.

5. In an ore-concentrator, the combination with a drum open at each end and having a suction-fan in one of said ends and feeding mechanism upon the drum; of a rotary magnetic disk in the opposite end of said drum, said disk having a series of apertures therein, insulating-linings within said apertures, and a scraper extending over the face of said disk.

6. In an ore-concentrator, the combination with a drum open at both ends and having a suction-fan in one end thereof and feeding mechanism upon the drum; of a rotary magnetic disk journaled in the opposite end of said drum, said disk having a series of apertures therein, an insulating-lining within each aperture in the disk, a trough arranged below and adjacent to the disk, and a scraper for removing particles from said disk and depositing them in said trough.

7. In an ore-concentrator, the combination with a drum open at both ends and having a reduced portion and feeding mechanism upon the drum; of a suction-fan in one of said ends, a magnetic disk in the opposite end of the drum, baffle-plates interposed between said fan and disk, and an outlet between said fan and plates, said outlet being adapted to receive particles from the reduced end of the drum.

8. In an ore-concentrator, the combination with combined drying and feeding mechanism, of a drum for receiving material discharged from said mechanism, an inclined reduced end to said drum, a suction-fan in one end of the drum, a rotary magnetic disk in the opposite end thereof, baffle-plates interposed between the disk and fan and adapted to retard the passage of material through the drum from the inlet thereto, a receptacle for receiving material from said plates, an outlet for receiving tailings from the inclined end of the drum, and means for automatically discharging said tailings from said outlet.

9. In an ore-separator the combination with a drum having a magnetic disk at one end, and a suction-fan at the opposite end; of a feeding mechanism upon the drum between said disk and fan, and a baffle-plate interposed between the disk and fan.

In testimony whereof I affix my signature in presence of two witnesses.

HOWARD E. MARSH.

Witnesses:
    J. A. TRAVIS,
    MARIE E. MCCABE.